United States Patent
Jensen et al.

(10) Patent No.: US 9,625,349 B2
(45) Date of Patent: Apr. 18, 2017

(54) TIME-STAMPED EMISSIONS DATA COLLECTION FOR PROCESS CONTROL DEVICES

(75) Inventors: Kurtis K. Jensen, Marshalltown, IA (US); Mitchell S. Panther, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 574 days.

(21) Appl. No.: 13/482,639

(22) Filed: May 29, 2012

(65) Prior Publication Data

US 2013/0223494 A1 Aug. 29, 2013

Related U.S. Application Data

(60) Provisional application No. 61/605,131, filed on Feb. 29, 2012.

(51) Int. Cl.
| | |
|---|---|
| *G06F 19/00* | (2011.01) |
| *G01M 3/28* | (2006.01) |
| *G01M 3/18* | (2006.01) |
| *F16K 37/00* | (2006.01) |
| *G05B 9/02* | (2006.01) |
| *G05B 23/02* | (2006.01) |

(52) U.S. Cl.
CPC ....... *G01M 3/2876* (2013.01); *F16K 37/0083* (2013.01); *G01M 3/184* (2013.01); *G05B 9/02* (2013.01); *G05B 23/0264* (2013.01)

(58) Field of Classification Search
CPC . G05B 23/024; G05B 23/0272; G05B 23/027

USPC .............. 700/9, 12, 27, 51, 80, 91, 282, 299
See application file for complete search history.

(56) References Cited

U.S. PATENT DOCUMENTS 4,176,689 A * 12/1979 Wrasman ................ F16K 5/061
137/797
5,353,315 A * 10/1994 Scarola et al. ................. 376/259
(Continued)

FOREIGN PATENT DOCUMENTS

| CN | 102287565 A | 12/2011 |
| JP | 58-152140 | 9/1983 |

(Continued)

OTHER PUBLICATIONS

1995 Protocol for Equipment Leak Emission Estimates, hereinafter referred to as Emissions, Nov. 1995.*
(Continued)

*Primary Examiner* — Darrin Dunn
(74) *Attorney, Agent, or Firm* — Marshall, Gerstein & Borun LLP (57) ABSTRACT

The claimed method and system provide a process control device monitoring system and a process control valve assembly with a process control device monitoring system to measure one or more operating states of a process control device. The process control device monitoring system may also associate a time-stamp with the one or more measured operating states of the process control device in response to a trigger generated based on the one or more measured operating states. The process control device monitoring system may also transmit the time-stamp and an indication of the one or more operating states to a monitoring device.

23 Claims, 5 Drawing Sheets

(56) References Cited

U.S. PATENT DOCUMENTS

| | | | |
|---|---|---|---|
| 5,431,182 A * | 7/1995 | Brown | G05B 6/05 137/487.5 |
| 5,659,302 A * | 8/1997 | Cordier | 340/870.11 |
| 5,768,119 A * | 6/1998 | Havekost et al. | 700/4 |
| 5,970,430 A | 10/1999 | Burns et al. | |
| 6,774,786 B1 * | 8/2004 | Havekost et al. | 340/517 |
| 7,250,856 B2 * | 7/2007 | Havekost et al. | 340/517 |
| 7,633,384 B2 * | 12/2009 | Kakimoto et al. | 340/506 |
| 7,657,384 B1 * | 2/2010 | Moses | 702/24 |
| 7,874,198 B2 * | 1/2011 | Groves | 73/31.01 |
| 8,269,620 B2 * | 9/2012 | Bullemer et al. | 340/506 |
| 8,554,714 B2 * | 10/2013 | Raymond et al. | 706/47 |
| 8,648,706 B2 * | 2/2014 | Ranjun et al. | 340/506 |
| 8,751,173 B1 * | 6/2014 | Moses | 702/51 |
| 2002/0035414 A1 * | 3/2002 | Morikawa et al. | 700/282 |
| 2002/0143478 A1 * | 10/2002 | Vanderah et al. | 702/45 |
| 2004/0011421 A1 * | 1/2004 | Bartlett et al. | 141/94 |
| 2005/0028037 A1 * | 2/2005 | Junk | G05B 19/0428 714/39 |
| 2005/0198649 A1 * | 9/2005 | Zakonov | G06F 11/3612 719/318 |
| 2006/0168396 A1 * | 7/2006 | LaMothe | G05B 23/0221 711/113 |
| 2006/0206272 A1 * | 9/2006 | Miller et al. | 702/24 |
| 2007/0068225 A1 * | 3/2007 | Brown | F16K 37/0075 73/40.5 A |
| 2007/0088446 A1 * | 4/2007 | Srinivasan et al. | 700/32 |
| 2007/0093970 A1 * | 4/2007 | Padmanabhan et al. | 702/23 |
| 2007/0171041 A1 * | 7/2007 | Kakimoto et al. | 340/506 |
| 2008/0082180 A1 | 4/2008 | Blevins et al. | |
| 2008/0120043 A1 * | 5/2008 | Miller et al. | 702/24 |
| 2009/0094259 A1 * | 4/2009 | Xu | G05B 15/02 |
| 2009/0113990 A1 * | 5/2009 | Groves | 73/31.01 |
| 2009/0222220 A1 * | 9/2009 | Wilke | F16K 37/0091 702/34 |
| 2010/0241399 A1 * | 9/2010 | Kavaklioglu | 702/179 |
| 2010/0318934 A1 * | 12/2010 | Blevins et al. | 715/772 |
| 2011/0022187 A1 * | 1/2011 | Felts et al. | 700/9 |
| 2011/0066598 A1 * | 3/2011 | Wilson et al. | 707/661 |
| 2011/0173496 A1 | 7/2011 | Hosek et al. | |
| 2012/0089920 A1 * | 4/2012 | Eick | 715/739 |
| 2012/0215488 A1 * | 8/2012 | Carter et al. | 702/182 |
| 2013/0110418 A1 * | 5/2013 | Nousiainen | 702/50 |
| 2013/0154841 A1 * | 6/2013 | Kucera et al. | 340/605 |
| 2013/0170417 A1 * | 7/2013 | Thomas et al. | 370/311 |
| 2013/0293389 A1 * | 11/2013 | Sinsuan et al. | 340/870.02 |
| 2013/0317659 A1 * | 11/2013 | Thomas et al. | 700/286 |

FOREIGN PATENT DOCUMENTS

| | | |
|---|---|---|
| JP | 2003058240 A | 2/2003 |
| JP | 2011113329 A | 6/2011 |

OTHER PUBLICATIONS

Communication Relating to the Results of the Partial International Search for PCT/US2013/027930, mailed Dec. 13, 2013.
Office Action issued Chinese Application No. 201310063860.5 dated Mar. 3, 2016.
Second Office Action issued in CN Application No. 201310063860.5 dated Sep. 14, 2016.
Office Action issued in Mexican Patent Application No. MX/a/2014/010158 dated Jun. 11, 2015.
Communication Under Rule 164(2)(a) EPC for EP Application No. 13 710 927.8 dated Dec. 8, 2016.

* cited by examiner

TIME-STAMPED EMISSIONS DATA COLLECTION FOR PROCESS CONTROL DEVICES

The priority benefit of U.S. Provisional Patent Application No. 61/605,131, entitled "Time-Stamped Emissions Data Collection for Process control Devices," filed Feb. 29, 2012, is claimed and the entire contents thereof are expressly incorporated herein by reference.

FIELD OF DISCLOSURE

The present disclosure relates to methods and apparatuses for monitoring process control devices, and, more particularly, to time-stamp monitored data collected for process control devices.

BACKGROUND

Process control valves are commonly used in fluid handling systems and fluid delivery systems to manipulate the flow of a fluid. In general, a process control valve may regulate flow by selectively allowing fluid to reach a destination or inhibiting fluid from reaching a destination. The fluid pressures associated with the systems often affect the operation of the valves. For example, valves may be opened or closed to manipulate the pressure at different points or stages of a process. In other examples, the operation of a valve may depend on pressure values at defined points in the system.

In process control systems involving gaseous agents, the process control valve may include a pressure relief valve designed to vent gases to the atmosphere during certain overpressure conditions. In some situations, the process control may malfunction and cause gases to be vented to the atmosphere.

Because the exact valve position or valve status (e.g., whether the valve is open, closed, in a bleed mode) is not always clear to an operator, a valve may be releasing gases without the operator's knowledge. These so-called fugitive emissions can negatively affect processing efficiency. The fugitive emissions may also present public health and safety risks, particularly to those in the vicinity of the process control system. Because of the public health risks, government regulatory bodies, for example the United States Environmental Protection Agency (EPA), may regulate the emission of such gases. As such, a process control system operator may be fined by a regulatory body for releasing gases, where the fine is typically based on the volume of fugitive emissions vented to the atmosphere. Therefore, while fugitive emissions are common in many processing applications, they do present unique problems for process control system operators.

To help address fugitive emissions, operators typically employ manual methods (e.g., manual inspections of the valve) to control or monitor valve operation. The effectiveness of such inspections, however, depends on the frequency of operator inspection and the accuracy with which the valve is checked. Any error could lead to considerable fugitive emissions without operator knowledge, which could further lead to substantial fines.

Process control system operators are typically fined based on a calculated volume of gases vented to the atmosphere. Calculating the actual volume of fugitive emissions is difficult; and therefore regulatory bodies apply worst-case scenario assumptions to the calculation, namely assuming a maximum flow rate of emissions over the entire time period between inspections, until the emissions have been shown to have stopped.

This worst-case scenario calculation can be extremely costly for an operator, because in practice fugitive emission releases are often brief, occurring between inspection cycles. Unfortunately, without information on emission flow rates, valve position, and valve release times, accurately calculating fugitive emissions data, to counter the determinations of the regulatory body, is not feasible. Therefore, there exists a need in the art for techniques to help operators detect fugitive emissions and more accurately quantify the amount of emissions.

BRIEF SUMMARY

Although process control devices typically include systems for monitoring device performance, assigning a time value to monitored data has heretofore proved challenging. One problem is that conventional monitoring systems do not time-stamp measured data before sending that data to a host system. Some monitoring systems transmit measured data to an intermediary data transfer component (i.e., multiplexer or gateway), which not only fails to time-stamp data, but actually introduces additional time delays before the data is actually received at the host system. Because host systems record the time data arrives, not the time the data was sent or measured, any time-stamping is inaccurate.

In response, described are systems and methods for recording a time-stamp at the field device (e.g., process control valve) and associating that time-stamp with measured data. As a result, when the measured data is transmitted to a receiving system, the data includes a time-stamp indicative of when the data was captured.

This new method of time-stamping measured process control system data at the field device results in calculations of greater accuracy, which can offer numerous advantages, including allowing for more accurate calculation of fugitive emissions.

For example, an operator employing the present techniques would be able to present to the regulatory agency time-stamped data indicating actual process control valve performance data. Such data may include when the valve was activated for fluid release, the position of the valve at different points within the activation cycle, the position of the valve when at what should be a fully closed position and whether there is any leakage of the valve, the total displacement of the valve, and the amount of time the valve was not fully closed. The present techniques may determine the actual volume of fugitive emissions released from the valve.

From any of the collected, time-stamped data, a process control system operator will be able to use this more-accurate, time-stamped data to assist the operator in adjusting process operations, as well as in confirming and/or correcting fugitive emissions numbers based on actual time-stamped data.

In accordance with an example, a method in a process control device monitoring system may comprise measuring, in the process control device monitoring system, one or more operating states of a process control device; associating, in the process control device monitoring system, a time-stamp with the one or more measured operating states of the process control device, where associating the time-stamp with the one or more operating states is in response to a trigger generated based on the one or more measured operating states; and transmitting the time-stamp and an indication of the one or more operating states to a monitoring device.

In accordance with an example, a process control valve assembly may comprise a valve to control a process; a position sensor to measure a position of a portion of the valve; a valve monitoring system to receive data from the position sensor, wherein the valve monitoring system is configured to associate a time-stamp with the data from the position sensor in response to a trigger, and wherein the valve monitoring system comprises a processor and a non-transitory computer-readable medium with instructions executable by the valve monitoring system; and a communications interface for transmitting data from the valve monitoring system.

BRIEF DESCRIPTION OF THE DRAWINGS

The present disclosure may be better understood by referring to the accompanying drawings, in which.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Process control systems are widely used in factories and/or plants in which products are manufactured or processes are controlled (e.g., chemical manufacturing, power plant control). Process control systems are also used in harvesting natural resources such as, for example, oil and gas drilling and handling processes, etc. In fact, virtually any manufacturing process, resource harvesting process, etc. can be automated through the application of one or more process control systems, including a system to capture and store a history of events (i.e., a data historian system).

The manner in which process control systems are implemented has evolved over the years. Older generations of process control systems were typically implemented using dedicated, centralized hardware and hard-wired connections. However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses.

In a typical industrial or process plant, a distributed process control system is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, pressure sensors, temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants. Field devices may also include, for example, input devices (e.g., devices such as sensors that provide status signals that are indicative of process control parameters such as, for example, temperature, pressure, flow rate, valve position), as well as control operators or actuators that perform actions in response to commands received from controllers and/or other field devices.

Figure 1:
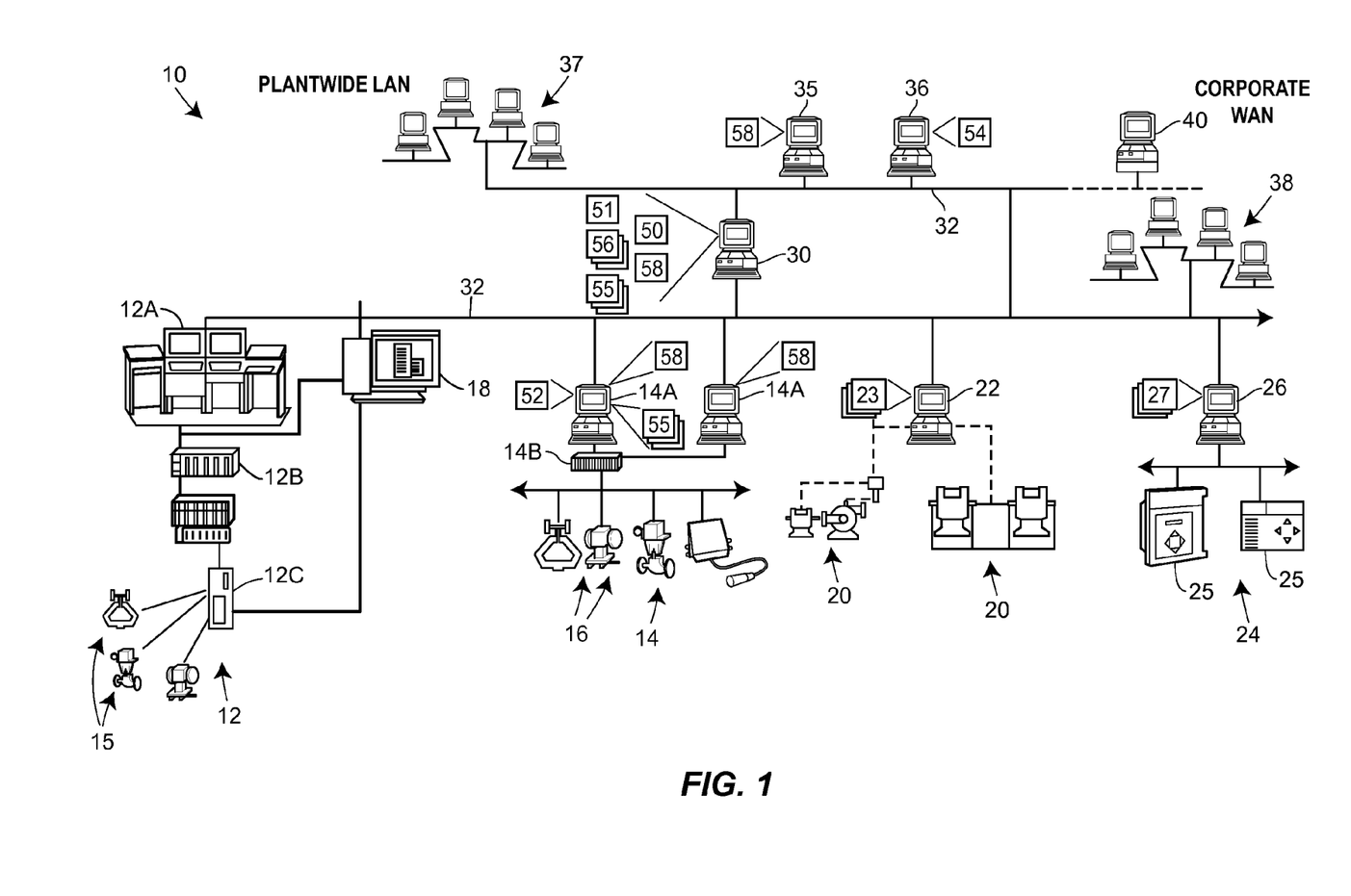
FIG. 1 is a diagram of a process plant configured to receive and coordinate data transfer between many functional areas of the plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX, RS3, or Ovation™ Expert Control System or any other distributed control system that includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, the DeltaV™ or Fisher Remote Operations Controller (ROC) systems sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

The computer system 30 as well as the other computing systems of FIG. 1 (e.g., 35, 36, 37, 38, 40) are communicatively connected to the process control system 12 and to the interface 18 associated with the process control system 12. These systems are connected via a bus 32, which may use any desired or appropriate local area network (LAN) or wide area network (WAN) protocol to provide communications.

While the bus 32 may be wired, in some embodiments the bus 32 may be wireless or comprise portions of the bus 32 that are wireless. For example, the plantwide LAN 37 may comprise a wireless connection to the computer 30 or to the corporate WAN 40. The wired or wireless portions of the bus 32 may also include using an Internet or intranet communications protocol (e.g., TCP/IP, UDP/IP, PPP). The wireless portions may also include using the WirelessHART communications protocol.

The systems and methods of embodiments of the present disclosure may include generating a message that conforms to the above-described communications protocols, where the message includes data relating to the process control device, including, for example, the position of a valve of the device.

The methods and apparatus of the present disclosure cooperate to monitor fugitive emissions resulting from open process control devices (e.g., valves). As discussed above, process control systems controlling or using a flow of gases or other fluids may comprise one or more pressure relief valves designed to vent some of the process gases to the atmosphere during overpressure conditions or other conditions. In some situations, these gas releases are done under the control of a system operator. For example, a system operator may notice that the pressure in a process control system is approaching a critical level. Rather than allowing a failsafe pressure release system to activate, the system operator may cause the process control system to vent some of the process gas in order to bring the system pressure under control. Such releases are done under the control of the operator, therefore the operator may be able to estimate the amount of process gas released to the atmosphere. However, in other situations, gases may be released without the operator's knowledge.

The methods and apparatuses of the present disclosure allow a process control system operator to accurately quantify the amount of each fugitive gas release from a process control valve. In an embodiment of the present disclosure, the methods and apparatuses include monitoring and transmitting time-stamped data related to the length of time a process control valve was not fully or continuously closed, when the process control valve changed positions, and the position that was reached when the process control valve changed positions. A process control valve monitoring system or other system would then be able to use that data to calculate the amount of fugitive emissions from the process control valve.

Process control valve devices known in the art pose challenges related to accurately monitoring fugitive emissions. One problem identified with known devices relates to how the devices send valve data to receiving systems and how the receiving systems are configured to receive and use the data. Many process control valve devices send data directly to receiving systems (e.g., a host) and the receiving systems record based on the time data arrives, rather than when the data was sent or measured by the process control valve device. This method of recording data is sufficient in many cases. However, with the advanced reporting features of process control devices, the devices can capture data and transmit the data at a later time. The delay in transmission may be on the order of millisecond, but could be much longer (e.g., hours, days). Because analysis of the data is done at the receiving system, calculations based on received data (e.g., calculations of emissions and energy use or loss) can be significantly affected by the delay in data transmission. This delay can become more pronounced in situations where devices send data through intermediary data transfer components (e.g., multiplexers or gateways) that accept data and retransmit the data to a host system for processing.

Embodiments of the present disclosure include process control valve monitoring systems capturing, time-stamping, and sending to a host system or other systems data related to a process control valve. The time-stamped data of the present disclosure provides a more exact time of when a change in valve position was detected. In an embodiment of the present disclosure, a valve monitoring system is located on or within close proximity to the process control valve. The valve monitoring system then directly monitors the valve and measures one or more operating parameters of the valve (e.g., valve position, valve status).

Figure 2:
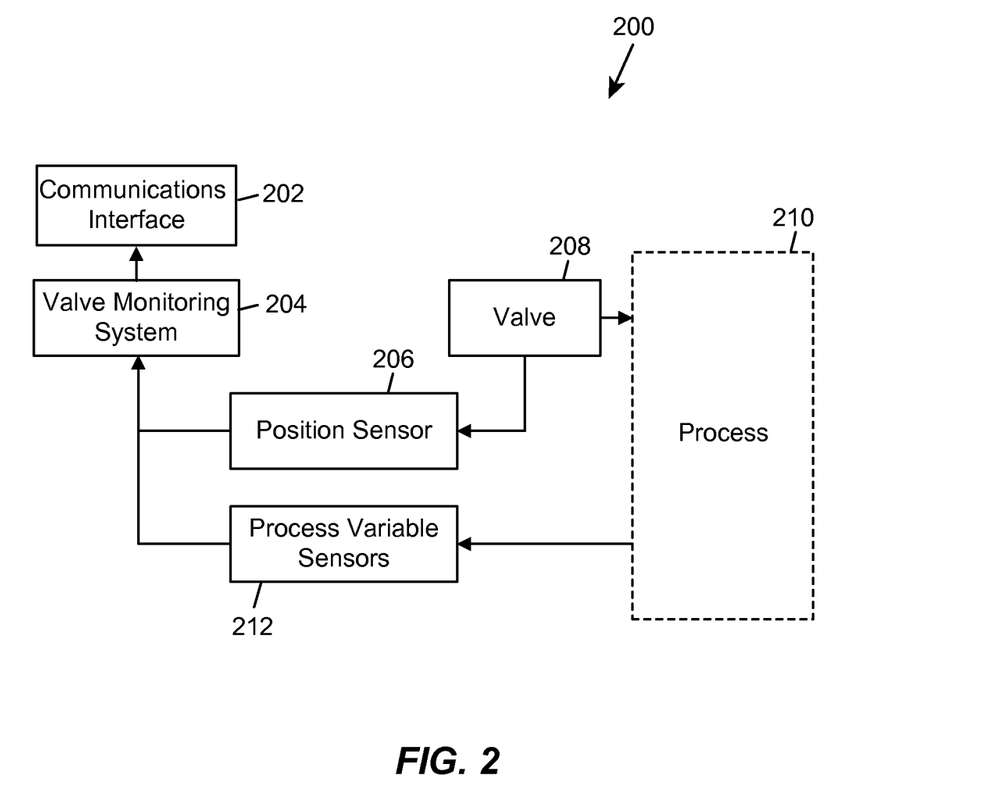
FIG. 2 is a block diagram of an example process control device monitoring system to passively monitor a process control device in the system of FIG. 1.

Turning to FIG. 2, a valve assembly 200 of an embodiment of the present disclosure may comprise a valve 208 to control a process 210. A valve monitoring system 204 monitors a state of the valve 208 and the process 210 using one or more position sensors 206 and one or more process variable sensors 212. The valve monitoring system 204 then uses the data from at least one of the position sensor 206 and the process variable sensors 212 to measure or calculate one or more operating characteristics of the valve 208 (e.g., flow rates, pressure values). The valve monitoring system 204 may then use the communications interface 202 to transmit the one or more calculated operating characteristics to a host system or other system configured to receive the one or more operating characteristics.

Figure 3:
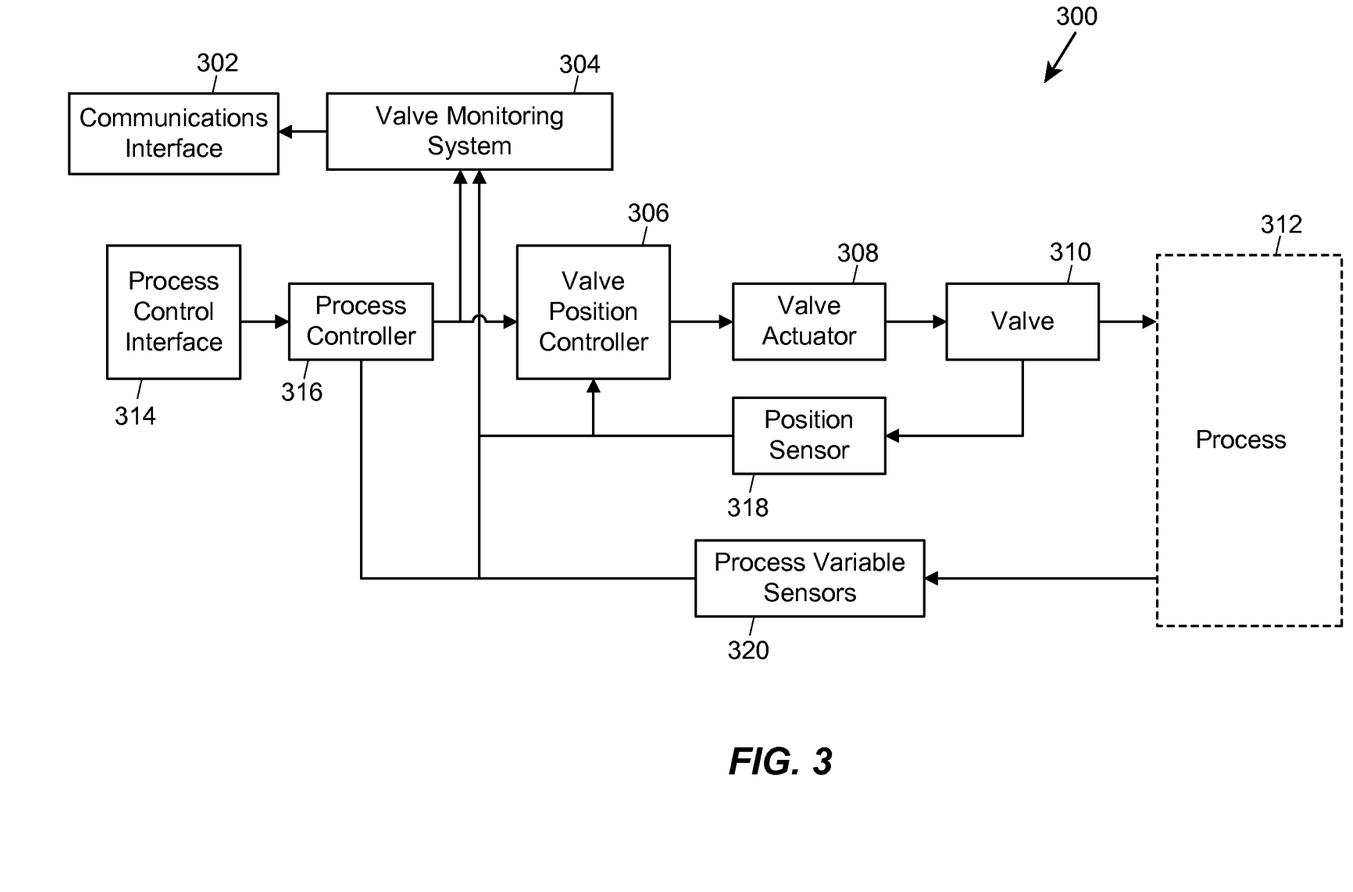
FIG. 3 is a block diagram of an example process control device control and monitoring system to control and monitor a process control device in the system of FIG. 1.

Turning to FIG. 3, a valve assembly 300 may be configured to control a process control valve 310 in addition to monitoring the process control valve 310. In a valve assembly 300 of this embodiment of the present disclosure, the valve assembly 300 may further include a process control interface 314, a process controller 316, a valve position controller 306, a valve actuator 308, in addition to the components of the valve assembly 200 of FIG. 2.

The valve monitoring system 204, 304 may also be configured capture and send raw measured data to a host system or other system. This raw measured data may include, for example, directly measured valve position, valve inlet pressure, valve outlet pressure, and a rate of fluid flow through the valve 208, 310. The receiving system may be configured to receive the raw data and calculate one or more operating characteristics of the valve 208, 310.

In another embodiment, the valve monitoring system 204, 304 may send to the host system or systems minimally processed valve data. Minimally processed valve data may include, for example, raw sensor data being subjected to a low-pass filter to remove any spurious data readings.

In another embodiment, the valve monitoring system may record data or report measured data in response to a trigger, for example a change in a process control valve 208, 310 lever position, a change in a pressure associated with the process control valve 208, 310, or a maximum or minimum value of the measured data.

In another embodiment, a recording interval for the valve monitoring system 204, 304 may be adjusted to process-specific specifications. While in some embodiments a system operator may want to receive an instant notification of fugitive emissions, the system operator may face other system constraints that limit the rate at which the valve monitoring system 204, 304 can send data. For example, in a communications network comprising many valve monitoring systems 204, 304 and other network-connected devices (see, e.g., FIG. 1), communications bandwidth constraints may require the valve monitoring systems 204, 304 to transmit data at a rate lower than ideal. In other embodiments, the system constraints may limit the rate at which other systems can receive data.

In another embodiment, a valve monitoring system 204, 304 may be configured to record and analyze valve characteristics and operating parameters at a rate significantly greater than the rate at which the valve monitoring system 204, 304 is configured to transmit those values. For example, the valve monitoring system 204, 304 may be configured to sample sensor data at 1 Hz even though the valve monitoring system 204, 304 is configured to only report sensor data once per hour. This may allow the valve monitoring system 204, 304 to more accurately track control valve 208, 310 events that will be later transmitted to a host system or other systems.

Figure 4:
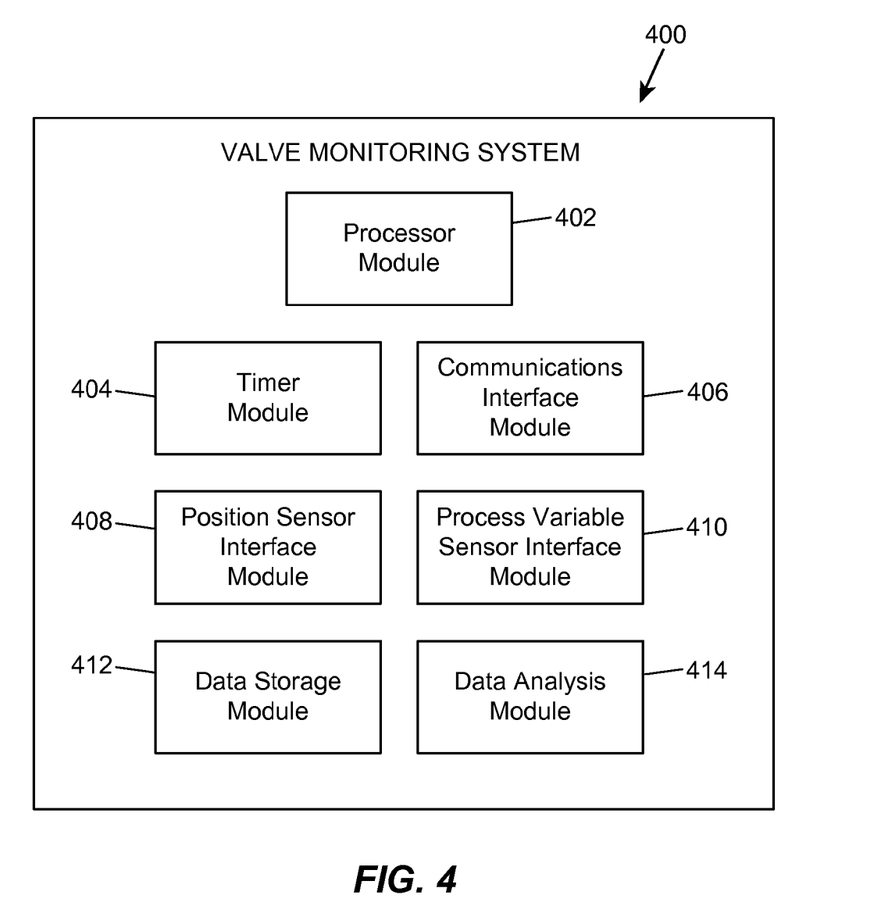
FIG. 4 is a block diagram of example modules that may be included in an integrated process control device monitoring system.

Turning to FIG. 4, a valve monitoring system 400 may comprise a number of functional modules 402-414. The valve monitoring system 400 may comprise a timer module 404 for providing a time-stamp associated with events of the valve monitoring system 400. The timer module 404 may provide a time-stamp in absolute time (e.g., a specific hour, minute, second, etc. of a specific day) or the timer module 404 may provide a time-stamp in relative time (e.g., a time related to a system runtime). In an embodiment, the timer module 404 may be separate from the valve monitoring system 400.

A communications interface module 406 may be configured to interface to one or more communications links. For example, for communicating over an Ethernet-based communications link, the communications interface module 406 may be configured to create and send a transmission control protocol (TCP) packet using the Internet protocol (IP). This combination is commonly referred to as TCP/IP. In another embodiment, the user datagram protocol (UDP) may be used instead of the TCP. This combination is commonly referred to as UDP/I P. In other embodiments, the communications interface module 406 may configured to interface with HART, Fieldbus, PROFIBUS®, WORLDFIP®, DeviceNet®, AS-Interface, or CAN protocols.

The valve monitoring system 400 may also comprise modules to interface to process control valve sensors. For example, the valve monitoring system 400 may include a position sensor interface module 408 for interfacing to a position sensor associated with a process control valve, such as the position sensors 206, 318. The valve monitoring system 400 may also include a process variable sensor interface module 410 for interfacing with process variable sensors associated with a process control valve or a controlled process. Process variable sensors may include flow rate sensors, pressure sensors, and temperature sensors. The position sensor interface module 408 and the process variable sensor interface module 410 may be configured to receive and process analog sensor data or digital sensor data.

The valve monitoring system 400 may also comprise modules for analyzing and storing sensor data and other data. For example, the valve monitoring system may comprise a data analysis module 414 for processing data from the position sensor interface module 408 or the process variable sensor interface module 410. The data analysis module may be configured to perform statistical analysis on the sensor data to generate summary statistics (e.g., maximum, minimum, and average values) for transmittal to a host system or other systems. The data analysis module 414 may also be configured to calculate operating characteristics of a process control valve from the sensor data. For example, the data analysis module 414 may calculate a volume flow rate through a process control valve using position sensor data from the position sensor interface module 408. The data analysis module 414 may also calculate a cumulative fugitive emissions volume using data from a combination of data from the position sensor interface module 408, the process variable sensor interface module 410, and the timer module 404.

A data storage module 412 may be used to store data from the position sensor interface module 408 and the process variable sensor interface module 410. The data storage module 412 may also store calculations or other data from the data analysis module 414. The data in the data storage module 412 may be stored in persistent storage (e.g., a hard disk, flash memory, static RAM) or the data may be store in non-persistent storage (e.g., system RAM).

The valve monitoring system 400 may include a processor module 402 that interfaces with or that comprises the above-described functional modules of the valve monitoring system 400. For example, the processor module 402 may be configured to receive data from the position sensor interface module 408 and the process variable sensor interface module 410 and cause the data analysis module 414 to analyze the data. The processor module 402 may also be configured to accept data from the data analysis module 414 and cause the data to be transmitted via the communications interface module 406. In an embodiment of the present disclosure, some of the modules may be configured to automatically interface with each other independent of the processor module 402. For example, the position sensor interface module 408 may be configured to automatically request time-stamp data from the timer module 404 in order to associate a time-stamp with position sensor data. The position sensor interface module 408 may also be configured to send the time-stamped data to the data analysis module 414 for processing. The process variable sensor interface module 410 may be configured to operate in a similar manner.

In some embodiments, one or more of the modules discussed above may be located in a host system or other systems. For example, the data analysis module 414 may be located in a host system that include processing power to conduct complex data analysis. Thus, the valve monitoring system 400 may be configured to transmit via the communications interface module 406 raw sensor data read by the position sensor interface module 408 and the process variable sensor interface module 410. A data analysis module 414 disposed in a host system or other system may then analyze the sensor data.

The valve monitoring system 204, 304 may communicate with a host system or other system using a known communications method. The communications method may include the valve monitoring system 204, 304 transmitting messages via the communications interface 202, 302 using a predefined message data unit format. For example, the valve monitoring system 204, 304 may use a message data unit format 500, illustrated in FIG. 5, that may comprise a data unit header 502 that may include message routing information (e.g., destination and source addresses). The message data unit 500 may also comprise a sequence number data field 504 for use by the system receiving the data to determine if, for example, the receiving system did not receive all data units 500 from the valve monitoring system 204, 304.

Figure 5:
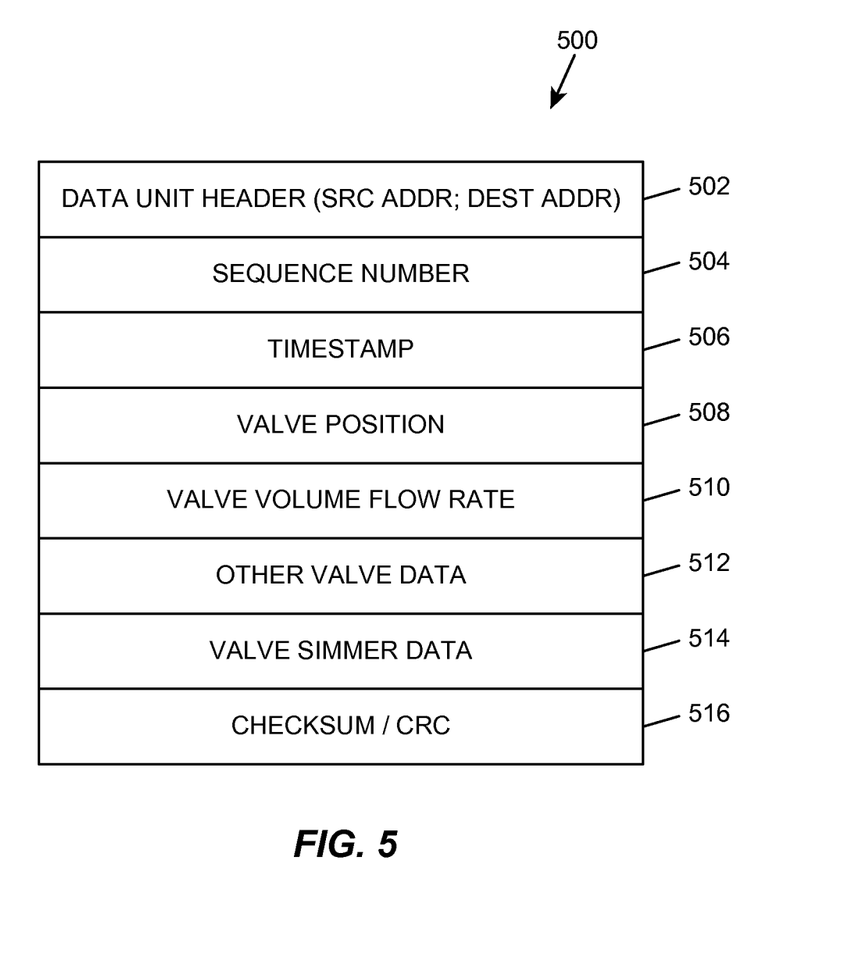
FIG. 5 is an example data table representing example data fields that may be transmitted from the process control device monitoring system.

In other embodiments of the present disclosure, the data included in the data unit 500 may be formatted and transmitted using other data formats (e.g., XML, JSON).

The data unit 500 may also comprise a time-stamp data field 506, where the time-stamp data field 506 includes an indication of a time at which data in the data unit 500 was captured. Alternatively, the time-stamp data field 506 may include an indication of a time at which the data unit 500 was sent from the valve monitoring system to the host system or other system.

The data unit 500 may also comprise data fields that include data measured or calculated by the valve monitoring system 204, 304. For example, the data unit 500 may comprise a valve position data field 508 for transmitting a measured or calculated position of a valve 208, 310. The data unit 500 may also comprise a valve volume flow rate data field 510 for transmitting a measured or calculated volume flow rate through at least a portion of a valve 208, 310.

In an embodiment of the present disclosure, the data unit 500 may also comprise an indication of an instantaneous or cumulative volume of fugitive emissions from the valve. In another embodiment, the data unit 500 comprises raw or minimally processed sensor data to allow the host or other system to calculate an instantaneous or cumulative volume of fugitive emissions from the valve.

The data unit 500 may also comprise other data related to operation of the process control valve 208, 310. An other valve data field 512 may comprise, for example, one or more of data related to an activation state of the process control valve, a leakage state in the process control valve, a total displacement of the process control valve, and an amount of time the process control valve was not fully closed.

As discussed previously, some process control valves 208, 310, including pressure relief valves, can experience a condition where the process control valve 208, 310 does not remain fully closed and, instead, oscillates between a closed position and an open position. This so-called simmering condition could lead to excess wear and tear on the valve's trim and seats. This wear and tear can, over time, lead to the valve 208, 310 not being able to maintain a tight shutoff, further adding to fugitive gas releases. Therefore, providing a process control operator simmering data may allow the process control system operator to know on which valves the operator should more frequently schedule maintenance in an effort to prevent fugitive emissions. Therefore, a valve simmer data field 514 may be included in the data unit 500 for transmitting process control valve 208, 310 simmering data.

Simmering data may also be useful to inform process control system operators of when a process control system is approaching its maximum capacity. This may be important for some process control system operators because, in some cases, having a process control system approach a simmering point, but not causing a process control valve (e.g., a pressure release valve) to vent (an event known as "lift") is considered an optimal operating point for some process control systems. Thus, simmering data can be useful to assist a process control system operator in determining when to increase or decrease a process control system's operating pressure in order to allow the system to reach an optimal operating level. For example, when a process control system operator is testing a new operating process, simmering data may inform the operator of where in a process control cycle the operator need to reduce operating pressures.

With the advent of wireless, battery-powered process control devices, energy conservation becomes increasingly important as power usage affects the time between which a process control device's power modules or batteries need to be replaced. Increased operating times of battery-powered devices can be accomplished by, among other things, limiting the number process variable samples and storing process variable samples until an upcoming periodic reporting opportunity. The interval between periodic reporting opportunities can be based on many factors, such as type and quality of wireless network connection.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

Still further, the figures depict embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for time-stamping monitored data collected for process control devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a process control device monitoring system, the method comprising:
   measuring, in the process control device monitoring system, one or more operating states of a process control device;
   associating, in the process control device monitoring system, a time-stamp with the one or more measured operating states of the process control device at a point in time when a fugitive emission, to a surrounding atmosphere, begins to occur, wherein the time-stamp is associated with the one or more operating states in response to a trigger that is generated based on the one or more measured operating states, and wherein the trigger is indicative that the fugitive emission has occurred; and
   transmitting the time-stamp and an indication of the one or more operating states to a monitoring device that quantifies an amount of fugitive emissions based on the time-stamp and the indication of the one or more operating states, wherein the time-stamp is associated with data from a position sensor in response to a trigger that is representative of a change in the data from the position sensor, a minimum value of the data from the position sensor, or a maximum value of the data from the position sensor.

2. The method of claim 1, wherein the process control device is a process control valve.

3. The method of claim 2, wherein the one or more operating states include one of the group consisting of an activation state of the process control valve, a position state of the process control valve, a leakage state in the process control valve, a total displacement of the process control valve, an amount of time the process control valve was not fully closed, and an indication of process control valve simmering.

4. The method of claim 3, wherein the position state comprises a position of the process control valve at different times during an activation state.

5. The method of claim 3, wherein the position state comprises an offset position of the process control valve from a fully closed position.

6. The method of claim 3, wherein the position state comprises an offset position of the process control valve from a fully opened position.

7. The method of claim 1, wherein the time-stamp is a start time, an end time, or a duration.

8. The method of claim 1, wherein the time-stamp is an absolute time or a relative time.

9. The method of claim 1 further comprising associating a time-stamp with each of a respective one of the one or more measured operating states.

10. The method of claim 1, wherein the trigger is a change in the one or more measured operating states, a minimum value of the one or more measured operating states, or a maximum value of the one or more measured operating states.

11. The method of claim 1, wherein transmitting the time-stamp and the indication of the one or more operating states to the monitoring device includes forming a data unit having a header field with data unit routing information and payload fields including one or more of a sequence number, a time-stamp, a valve position, a valve volume flow rate, valve simmer data, and a checksum or CRC.

12. The method of claim 1, wherein the method is executed in response to a request from an external device.

13. The method of claim 1 further comprising receiving a request for operating state data, wherein transmitting the time-stamp and the indication of the one or more operating states to the monitoring device is in response to the request for operating state data.

14. The method of claim 1, wherein the time-stamp and the indication of the one or more operating states are transmitted to the monitoring device at a periodic rate.

15. The method of claim 1, wherein transmitting the time-stamp and the indication of the one or more operating states to the monitoring device includes transmitting the time-stamp and the indication of the one or more operating states according to a protocol including one of TCP/IP, UDP/IP, HART, Fieldbus, PROFIBUS, WORLDFIP, Device-Net, AS-Interface, and CAN.

16. A process control valve assembly comprising: a valve to control a process;
a position sensor to measure a position of a portion of the valve;
a valve, monitoring system to receive data from the position sensor, wherein the valve monitoring system is configured to associate a time-stamp with the data from the position sensor, at a point in time when a fugitive emission, to a surrounding atmosphere, begins to occur, wherein the valve monitoring system comprises a processor and a non-transitory computer-readable medium with instructions executable by the processor of the valve monitoring system to quantify an amount of fugitive emissions based on the time-stamp and the data from the position sensor; and
a communications interface for transmitting data, from the valve monitoring system that is representative of the amount of fugitive emissions, wherein the time-stamp is associated with the data from the position sensor in response to a trigger that is representative of a change in the data from the position sensor, a minimum value of the data from the position sensor, or a maximum value of the data from the position sensor.

17. The process control valve assembly of claim 16, wherein the time-stamp is a start time, an end time, or a duration.

18. The process control valve assembly of claim 16, wherein the time-stamp is an absolute time or a relative time.

19. The process control valve assembly of claim 16 further comprising a process variable sensor to measure the process, wherein the valve monitoring system is configured to receive data from the process variable sensor and associate a time-stamp with the data from the process variable sensor in response to a trigger.

20. The process control valve assembly of claim 19, wherein the trigger is a change in the data from the process variable sensor or the position sensor, a minimum value of the data from the process variable sensor or the position sensor, or a maximum value of the data from the process variable sensor or the position sensor.

21. The process control valve assembly of claim 16, wherein the data transmitted from the valve monitoring system includes one of the group consisting of an activation of the valve, a position of a portion of the valve at different points within an activation cycle of the valve, a position of the valve when the valve should be at a fully closed position, an indication of a leak in the valve, an indication of the total displacement of a portion of the valve, an indication of an amount of time the valve was not fully closed, and an indication of valve simmering.

22. The process control valve assembly of claim 16, wherein the communications interface is configured to transmit data according to a protocol including one of TCP/IP, UDP/IP, HART, Fieldbus, PROFIBUS, WORLDFIP, Device-Net, AS-Interface, and CAN.

23. The valve assembly of claim 16 further comprising:
a valve actuator to change a position associated with the valve;
a valve position controller to control the valve actuator; and
a process controller to receive commands to cause the valve position controller to control the valve actuator in response to the commands.

* * * * *